United States Patent [19]

Lin

[11] Patent Number: 5,764,641
[45] Date of Patent: Jun. 9, 1998

[54] EARLY AND INTEGRATED TAIL PACKET DISCARD SYSTEM

[75] Inventor: Arthur Lin, San Ramon, Calif.

[73] Assignee: Cisco Systems, Inc., San Jose, Calif.

[21] Appl. No.: 525,252

[22] Filed: Sep. 8, 1995

[51] Int. Cl.[6] .................................................. H04L 12/56
[52] U.S. Cl. ............................................. 370/412; 370/429
[58] Field of Search .................................... 370/429, 399, 370/394, 235, 395, 412, 414, 416, 418, 428; 380/49

[56] References Cited

U.S. PATENT DOCUMENTS

| | | | |
|---|---|---|---|
| 5,166,930 | 11/1992 | Braff et al. | 370/235 |
| 5,231,633 | 7/1993 | Hluchyj et al. | 370/429 |
| 5,303,302 | 4/1994 | Burrows | 380/49 |
| 5,321,692 | 6/1994 | Wallmeier | 370/399 |
| 5,323,389 | 6/1994 | Bitz et al. | |
| 5,434,855 | 7/1995 | Perlman et al. | 370/394 |
| 5,479,401 | 12/1995 | Bitz et al. | |
| 5,495,478 | 2/1996 | Wilkinson et al. | 370/399 |
| 5,528,588 | 6/1996 | Bennett et al. | |
| 5,541,918 | 7/1996 | Ganmukhi et al. | |
| 5,548,588 | 8/1996 | Ganmukhi et al. | 370/60.1 |

*Primary Examiner*—Chi H. Pham
*Assistant Examiner*—Ricky Ngo
*Attorney, Agent, or Firm*—Cesari and McKenna, LLP

[57] ABSTRACT

A switch in an asynchronous transfer mode system utilizes an early packet discard (EPD) scheme and discards all but the end-of-packet cell of packets that are expected to prevent other partially transmitted packets from being transmitted through the switch. The switch also utilizes an integrated tail packet discard (I-TPD) scheme and, once a cell of a packet has been discarded for any reason, discards all of the remaining cells of the packet except the end-of-packet cell. Each of the EPD and the I-TPD schemes retain the last cell of a packet in order to maintain packet boundaries. Further, they each set the loss-priority of the end-of-packet cell to high, to increase the likelihood that the cell will be transmitted through the remaining switches in the route to the station to which the packet is directed. When the end-of-packet cell is received, the switch retains the cell unless its maximum queue limit is exceeded, and resets any associated early or tail packet discard flag. When the beginning of the next packet is received, the switch checks its queue length against an associated queue limit and against a CLP and an EPD threshold to determine whether or not to retain the cell. If the cell is discarded, the switch invokes, as appropriate, either the EPD or I-TPD and thereafter discards cells of the same packet. It invokes EPD when the queue limit exceeds the EPD threshold, and invokes I-TPD if it discards this or any cell when (a) it is policing a usage or network parameter control violation, (b) its associated queue exceeds an applicable queue limit, or (c) it selectively discards low-priority cells.

24 Claims, 8 Drawing Sheets

EARLY AND INTEGRATED TAIL PACKET DISCARD SYSTEM

FIELD OF THE INVENTION

This invention relates generally to asynchronous transfer mode systems and, more particularly, to such systems that selectively control the discarding of information.

BACKGROUND OF THE INVENTION

Asynchronous transfer mode (ATM) systems transmit data over a network as a plurality of fixed-length units, or cells. The individual transmissions typically include one or more cells that constitute a portion of the much larger, variable-length packets that are utilized by end systems or applications. Thus, before transmission a source station segments a packet into a number of cells. For example, the source station segments an FDDI packet of 4500 bytes into over 90 cells. It then transmits the cells in a number of multiple-cell frames or bursts. A destination station, after receiving all the cells associated with a packet in a plurality of transmissions, reassembles the cells into the packet and provides the packet to the end system or application. If portions of the packet, that is, one or more of the cells, are dropped during transmission, the packet is corrupted and the remaining cells are generally useless to the end system or application.

With a connection-oriented ATM that uses ATM adaptation layer 5 (AAL5), the system establishes, between the source station and the destination station, a particular route or "virtual circuit" over which the cells are to travel. The source station transmits the cells, in order, over the virtual circuit and the cells arrive at the destination station in the same order. Cells from other packets that are traveling over a different, intersecting virtual circuit are typically interleaved with the cells, and thus, alter their time but not their order of arrival at the destination station. The destination station de-interleaves the cells based on included virtual circuit information before it reassembles them into the associated packets. Accordingly, only cells routed over different virtual circuits may be interleaved when AAL5 is used. If AAL 3/4 is used, multiple packets, and thus, cells, can be interleaved over a single virtual circuit. These packets will, however, include different message identifier values, which a destination uses to de-interleave them.

Problems arise when the network becomes congested and intermediate routers or switches (referred to herein generally as switches) do not have sufficient buffer capacity to handle incoming traffic. Known prior switches discard incoming cells when their buffers are full. Then, as soon as there is sufficient buffer space available, they again retain the incoming cells. Accordingly, they may discard a portion of a packet and retain the preceding and succeeding portions, or fragments, of the packet. These essentially useless packet fragments continue to travel over the network, taking up network resources. Further, the buffer switch capacity devoted to these packet fragments is then unavailable to the cells of complete, or "good," packets. Also, if the packet requires a reliable transport service, the incomplete packets must be retransmitted. These retransmitted packets then add to the network congestion.

Problems similar to those encountered during congestion arise when the switches are used to police usage parameter control (UPC) or network parameter control (NPC) violations. These violations occur when a user attempts to utilize more bandwidth then he or she is entitled to under the terms of his or her service contract or under the network policies. The service provider may enforce the UPC or NPC by requiring that the switches discard those cells that are in violation. Accordingly, the switch that introduces the packet to the network and typically the switches at the network boundaries check for the UPC/NPC violations and, as necessary, discard the violating cells on a per-connection basis. This means that at various points along the route the cells from any number of packets may be discarded either before or after other cells from the same packets are transmitted. The result is the transmission of packet fragments, which take up network resources that may instead be devoted to the cells of complete packets.

In some applications, such as video transmissions, certain cells are less important than other cells to an end system or application. For example, in MPEG applications or in subband video coding applications, the cells that include image information are more important than the cells that contain information for fine tuning the image. The transmission is still usable even if a congested switch discards one or more of the cells that contain the fine-tuning information. The end result is that the quality of the image is not as good.

In ATM each cell contains a header that includes a cell loss priority, or CLP, bit that a user or a network node may set to 1 to indicate that the cell has a "low loss-priority." The low priority cells are the first cells to be discarded by a switch that is performing the congestion avoidance technique of CLP-selective discarding. Using CLP-selective discarding, a switch that is becoming congested discards the cells with low loss-priority, and retains those with high loss-priority. In the MPEG applications, for example, the user may set the CLP bits to 1 in the cells that contain the fine tuning information. Thereafter, when a switch performs CLP-selective discarding, it may selectively discard these low loss-priority cells, to save room in its buffers for the higher priority image-information cells. This CLP-selective discarding does not adversely affect the end system or application, as long as the only cells that are discarded are those that contain incidental information, such as the MPEG fine tuning information.

Problems arise, however, if the CLP bit may be set by intermediate switches, such as those switches that are policing the UPC or NPC violations. If, for example, the service provider determines that the violating cells should be "tagged" before being discarded, the switch policing the violations sets the CLP bit to 1 in each of the violating cells. This indicates that these cells now have low priority. If these tagged cells are again found to be in violation of the UPC/NPC, they may be discarded. Thereafter, tagged cells that conform to the UPC/NPC are retained and further transmitted. This may result in fragments of the associated packet being sent over the network.

The tagged cells may also be discarded by a switch that is performing CLP-selective discarding. The selective discarding, like the UPC/NPC violation discarding, may thus result in the fragmenting of the associated packets.

There is a need for a mechanism that discards cells in a way that minimizes packet fragmentation. If fragmentation is unavoidable, the mechanism should discard as many of the fragments as possible, to maximize the network resources available for the transmission of complete packets.

SUMMARY OF THE INVENTION

The invention is an ATM system that utilizes at its switches an early packet discard (EPD) scheme and an integrated tail packet discard (I-TPD) scheme that maximize the number of complete and/or usable packets transmitted over the network. When a switch that is operating in accordance with the EPD mechanism receives a first cell of a packet, it determines whether or not the entire packet will likely be transmitted through the switch. It thus checks the buffer queue associated with the output port that is part of the virtual circuit identified in the cell and determines if the queue, or more specifically, the queue occupancy, exceeds a predetermined EPD buffer threshold. If the length of the queue does not exceed the threshold, the switch retains the cell in its buffer. Thereafter, as long as there is sufficient buffer space available, that is, as long as the output port queue has not reached its queue limit, the switch retains the remaining cells of the packet, regardless of whether or not the associated output port queue exceeds the EPD buffer threshold. In this way the switch avoids fragmenting the packet.

As discussed in more detail below, the EPD buffer threshold may be based on a service class per port queue limit, a virtual connection queue limit, or a two tier threshold, in which the connection threshold is checked only if the service class threshold is exceeded.

If the output port queue exceeds the EPD buffer threshold when the first cell of the packet is received, the switch discards the cell. It then discards every other cell associated with the same packet, except the end-of-packet (EOP) cell, which it retains, if possible, to maintain packet boundaries. The switch thus discards all of the cells it receives over the virtual circuit that is identified in the discarded cell until it receives the EOP cell.

Using the EPD scheme, the switch pre-empts packets that are not likely to be transmitted in their entirety through the switch. It thus saves buffer space for the cells of the packets that have already been partially transmitted through the switch. By retaining the EOP cell the switch maintains packet boundaries, so that the remaining switches in the virtual circuit can determine the end of the previous packet and the beginning of the succeeding packet.

The I-TPD is used by the switch to ensure that if one cell of a packet is discarded, for any reason, the remaining cells of the packet are also discarded. The I-TPD mechanism, like the EPD mechanism, retains the EOP cell to maintain packet boundaries.

The switches also control the introduction of packets to the network and the selective discarding of packets based, respectively, on the usage parameter controls (UPC) or network parameter controls (NPC) and various buffer thresholds, as discussed in more detail below. Briefly, the switch, if appropriate, determines whether a cell is in violation of the UPC or NPC. If a cell is in violation, the switch may, depending on the user's contract with the network service provider or the network guidelines, (i) transmit the cell and charge the user a premium; (ii) "tag," the cell, that is, lower the cell-loss-priority (CLP) of the cell, and then transmit it; (iii) delay the cell and then transmit it; or (iv) discard the cell.

If the cell is not discarded for violating the UPC or NPC, the switch determines if the output port included in the associated virtual circuit has available to it sufficient buffer capacity to hold the cell. The switch thus compares the length of the output port queue with the appropriate queue limit, as discussed in more detail below. If the limit is exceeded, the switch discards the cell.

Assuming the switch is operating in its CLP-selective discarding mode and the cell has not yet been discarded, the switch next determines if the cell has a low loss-priority, that is, if the cell's CLP bit is set to 1, and, also, if the output port queue has reached a low-CLP buffer threshold. If so, the switch discards the cell. Otherwise, the switch retains the cell, as long as the EPD flag or, as discussed below, an I-TPD flag is not set.

Each time a cell is discarded, whether for a UPC/NPC violation, because of an exceeded buffer limit or CLP threshold, the switch invokes its I-TPD scheme and discards all of the remaining cells of the same packet, except the EOP cell. It thus discards all the cells it receives over the virtual circuit identified in the first discarded cell until it receives the EOP cell. Assuming the queue has not reached its queue limit when the switch receives the EOP cell, the switch sets the priority of the EOP cell to high and passes it to the buffer. This increases the probability that the packet boundaries will be retained through the succeeding switches in the virtual circuit.

The EPD and I-TPD schemes maximize the number of complete packets transmitted through the network by ensuring that network resources are utilized by the complete packets or by a minimum number of packet fragments. Using the EPD mechanism, the switch pre-empts packets that are most likely to be fragmented and saves room in its buffer to prevent the fragmenting of packets that have already been partially transmitted, while also preserving packet boundaries. Using the I-TPD mechanism, the switch minimizes the number of packet fragments that are transmitted by ensuring that once a cell is discarded, for any reason, all of the remaining cells of the same packet, except the EOP cell, are also discarded. This is in contrast to known prior systems that essentially control discarding cell-by-cell, and ignore packet boundaries.

BRIEF DESCRIPTION OF THE DRAWINGS

The above and further advantages of the invention may be better understood by referring to the following description in conjunction with the accompanying drawings, in which:

FIG. 7 is a flow chart of the operations of a switch that is performing early and integrated tail packet discard.

DETAILED DESCRIPTION OF ILLUSTRATIVE EMBODIMENTS

The system is described herein in terms of AAL5. The system may also be used with any other adaptation layer that includes in the headers of the associated cells a flag that the user can set to delineate packet, or as appropriate, message, boundaries.

Figure 1:
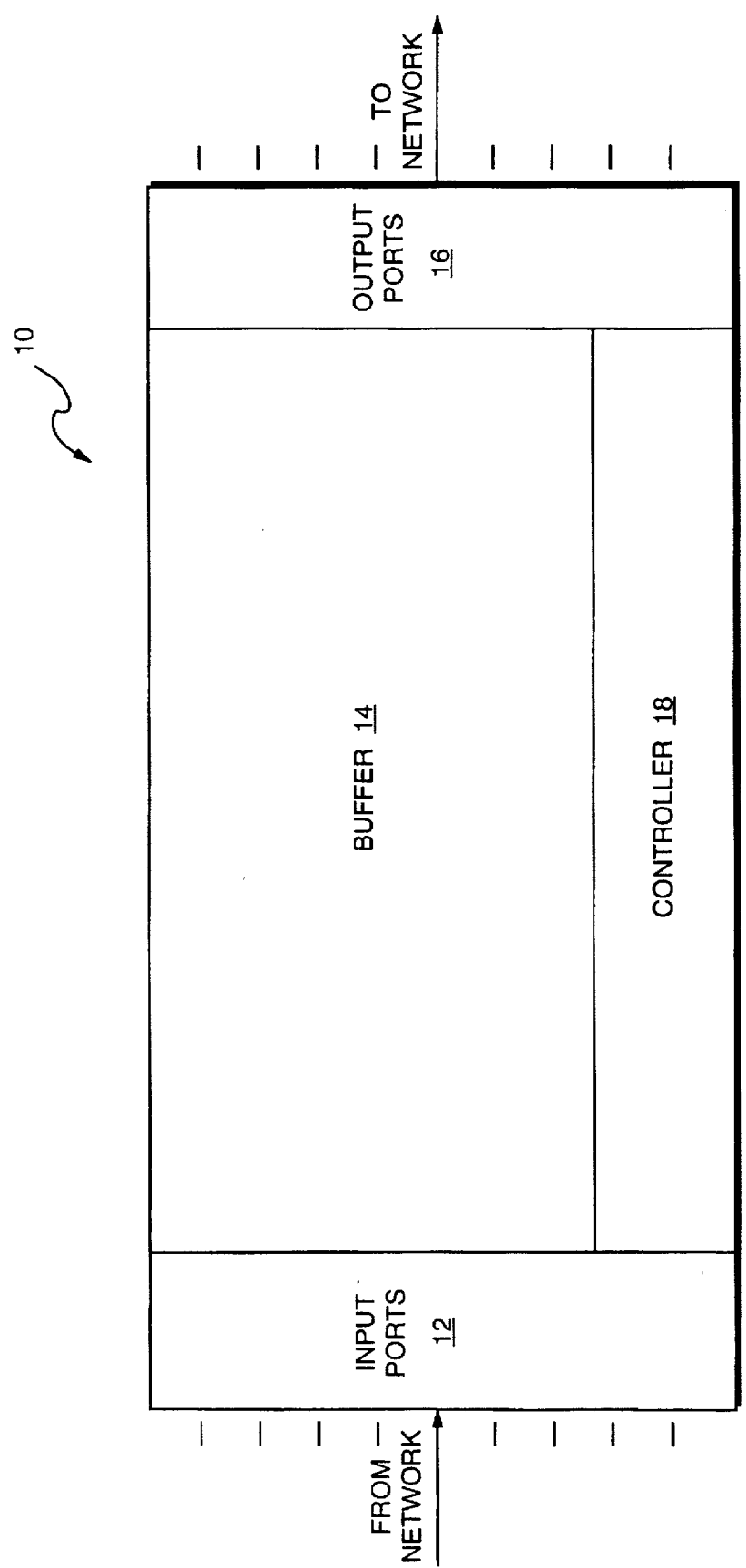
FIG. 1 is a functional block diagram of a switch that is constructed in accordance with the invention.

FIG. 1 depicts in simplified form a switch 10, which includes a plurality of input ports 12 that receive information over a network (not shown) and a plurality of output ports 16 that transmit information over the network. A buffer 14, which is preferably dynamically allocated among the output ports, as needed, retains the received information that is awaiting transmission. A controller 18 controls the operations of the input and output ports 12 and 16, and the buffer 14.

The output ports 16 share the buffer's capacity, based on predetermined queue limits associated with the ports. The queue limits are based on, among other things, the type of connections associated with each of the individual ports; the expected distribution of packet sizes to be transmitted by the port; the expected traffic distribution among the individual output ports; the expected duration of the congestion periods; the expected proportion of incoming cells, during the congestion periods, that belong to partially transmitted packets; the interaction of the ATM-level and transport-level flow and congestion control mechanisms; and how much of the buffer is expected to be shared with non-early/integrated-tail packet discard traffic.

Further, the user or service provider must determine a trade-off between a (statistically) complete sharing of the buffer, in which one or a small number of ports could occupy the entire buffer, and the fairness of the sharing of the buffer, to ensure that each port has reserved to it a portion of the buffer's capacity.

There are four system-wide, configurable maximum buffer limits, $L_i$, that correspond to four delay service classes. If the total buffer capacity is 64 kilo-cells, for example, the output queue limits for each delay service class, $L_j$, are:

$$\Sigma_j Q_{ij} \leq L_i \leq 64k$$

where i represents the services classes, i=1, 2, 3, 4; j represents the output ports, j=1, 2 ... n; and $Q_{ij}$ is the queue occupancy of the service class i at output port j and $Q_{ij} \leq L_{ij}$. The default value of $L_i$ for each service class is equal to the maximum buffer capacity, or 64k.

An "over subscription" factor, OSF, which represents the trade off between sharing and fairness among the output ports, is defined as:

$$OSF = \frac{\Sigma \Sigma L_{ij}}{64K}$$

An OFS of 1 represents minimum sharing and maximum fairness, an OFS of n, where n is the total number of output ports, represents maximum sharing and minimum fairness, and any OFS between these two values represents a trade off between the maximum fairness and maximum sharing.

The default value of a maximum queue limit for each port, i.e., for any j, is:

$$\Sigma_j L_{ij} = \frac{OSF \times 64K}{n}$$

If the characteristics of the port, such as the physical medium to which the port is connected, and the delay/loss guarantees of the respective service classes are taken into consideration, the output port's queue limits for the various service classes may differ. However, the total of the queue limits for all of the ports must, for each service class, be within the maximum buffer limit per class, $L_i$.

Each time a cell is received, the controller 18 determines if the cell should be retained in the shared buffer 14 for further transmission, or if the cell should be discarded in accordance with an EPD/I-TPD scheme. The operations of the controller 18 are discussed in more detail below with reference to FIGS. 3–5.

Figure 2:
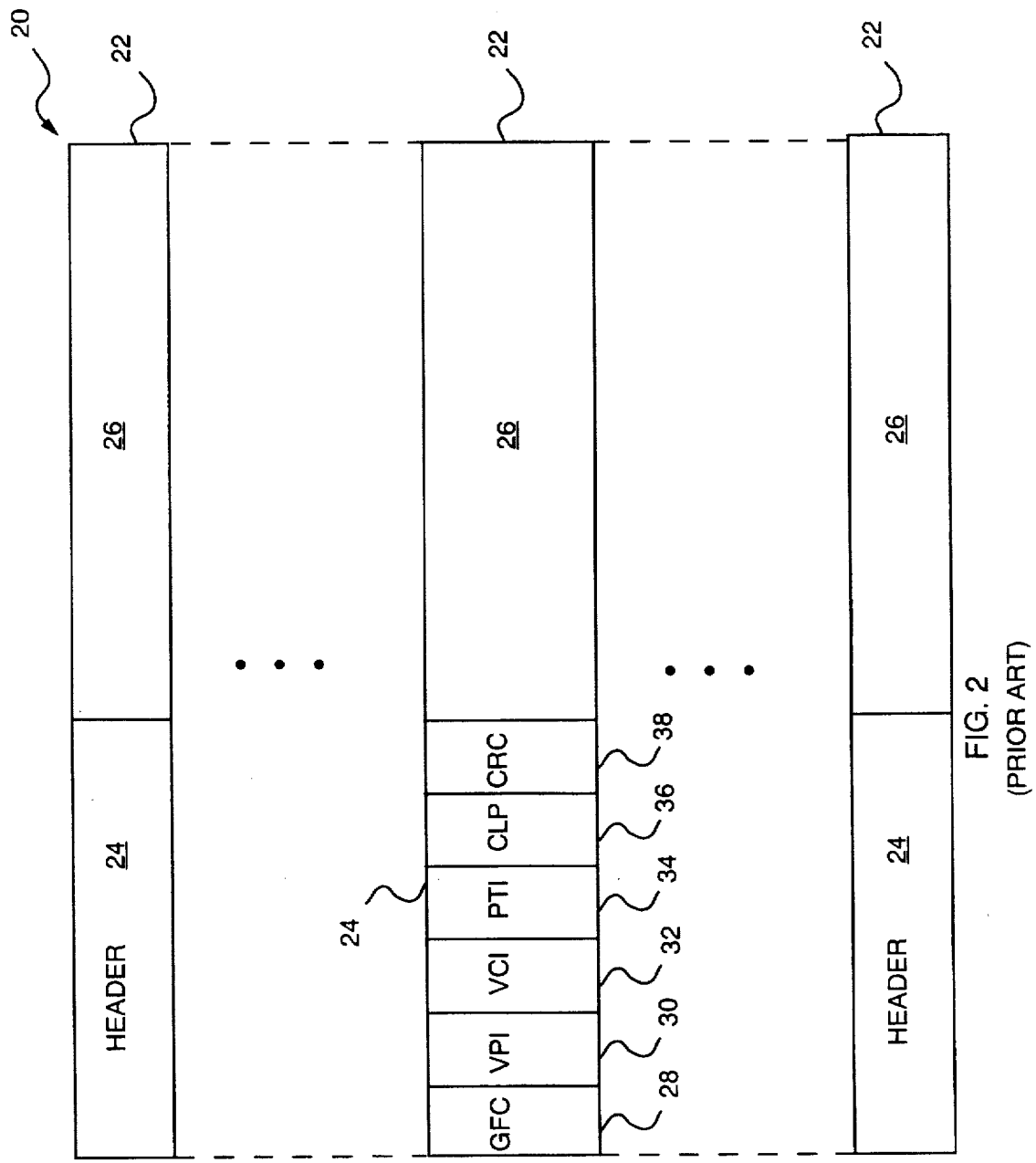
FIG. 2 is an illustration of a cell.

Referring now to FIG. 2, before a packet 20 is transmitted over the network over a virtual circuit that has been previously established a source station (not shown) segments the packet into a plurality of fixed-length cells. Each cell 22 includes a 5-byte header 24 and a 48-byte payload 26. The header 24 includes a generic flow control field 28, a virtual path identifier (VPI) field 30, a virtual circuit identifier (VCI) field 32, a payload type identifier (PTI) field 34, a 1-bit cell loss priority (CLP) field 36, and an 8-bit header CRC 38. The PTI field includes a multi-bit flag that is reserved for user-specific information. In AAL5, this flag is a "status" flag that is set to a particular value, for example, 0×1 to represent a packet boundary, i.e., the beginning or end of a packet. The X may be either a 0 or a 1, and thus, the flags indicating packet boundaries are either 011 or 001. In the preferred embodiment, this flag used to represent the last cell, or end, of the packet (EOP).

The source station sets the VPIs and VCIs in the respective fields 30 and 32 of each cell 22 to correspond to the route that the station has established for the packet. It also sets the PTI status flags to appropriate values. It thus sets the status flag in the EOP cell to 0×1 and the flags in the other cells 0×0. As appropriate, the station also sets the CLP bit to 1 to indicate that the cells have low loss-priority, based on the application for which the cell is intended. The CLP bit set to 1 indicates that the cell may be readily discarded to avoid congestion, and a CLP bit that is instead set to 0 indicates that the cell should be retained, if possible. For example, the station sets the CLP bits to 1 in the cells that contain incidental information that is not specifically required by the end system, such as the fine tuning information for a video transmission. By default, the CLP bits are set to 0.

The CLP bit 36 may be reset by switches along the virtual circuit, as appropriate, to correspond to a change in priority. The resetting of the CLP bit is discussed below with reference to FIG. 4.

A. Early Packet Discard (EPD)

Figure 3A:
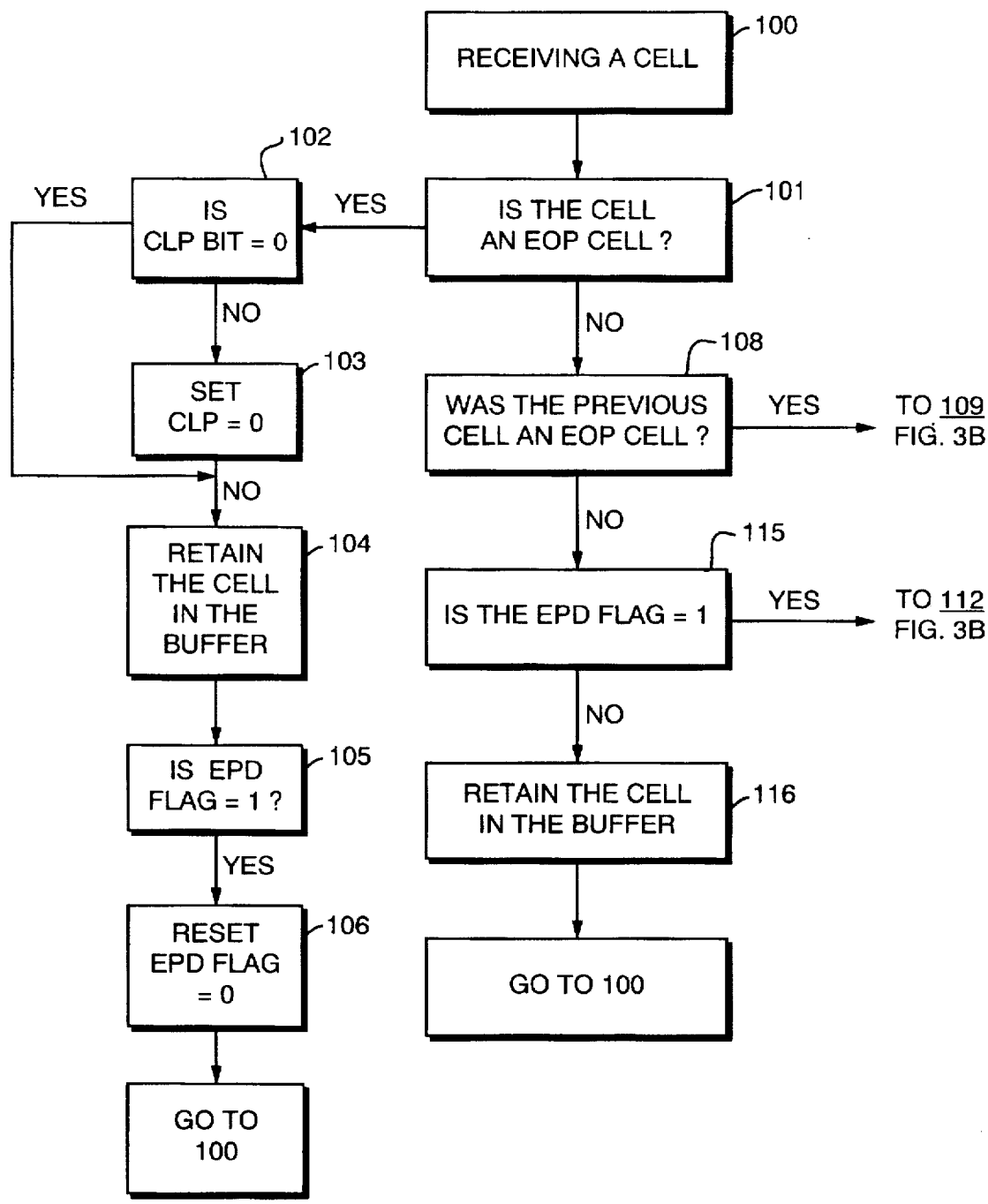
FIG. 3 is a flow chart of the operations of a switch that is performing an early packet discard.
Figure 3B:
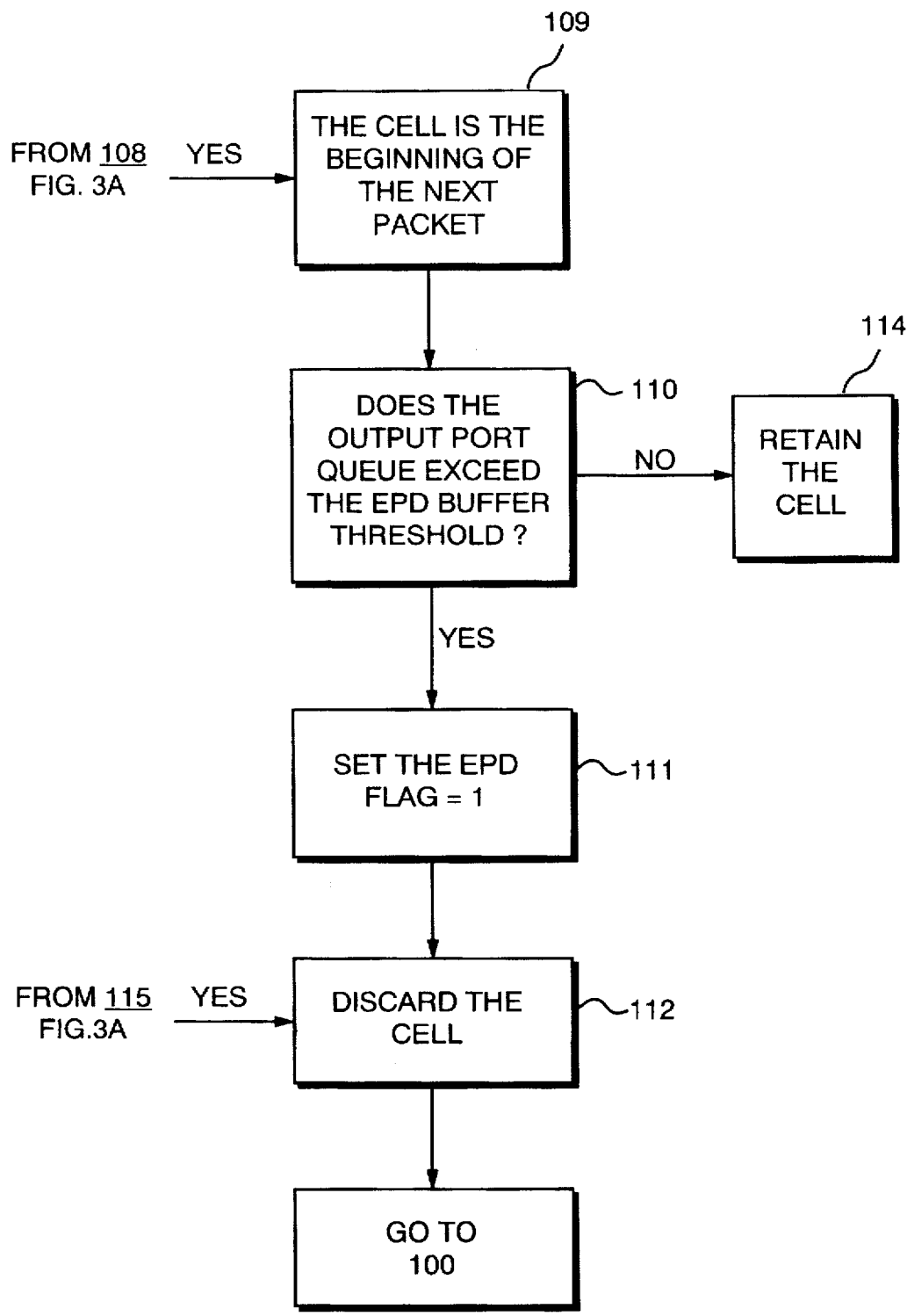

Referring now to FIGS. 1–3, when the switch 10 receives a cell 22 (step 100), the controller 18 determines if the cell should be retained or discarded using an early packet discard (EPD) mechanism. The controller 18 first determines if the cell is an end-of-packet (EOP) cell, based on the state of the status flag in the cell's PTI field 32 (step 101). If the status flag is 0×1, which indicates that the cell is the EOP cell, the controller, as necessary, resets the CLP bit in the header to 0, and passes the cell to the buffer 16 (steps 102–104). By setting the CLP bit to 0, the controller increases the likelihood that the EOP cell will be transmitted through the remaining switches on the virtual circuit, and thus, that the packet boundaries will be maintained throughout the transmission.

After the EOP cell, the controller receives next over the same virtual circuit the first cell of the next packet (steps 108–109). To determine if this cell should be passed to the buffer or discarded, the controller compares the length of the associated output port's queue of retained cells with a user or system-computed EPD buffer threshold (step 110). The default setting of the EPD threshold may be, for example, 50% of the associated queue limit.

The EPD buffer threshold is a percentage of the associated queue limit. It may be based on a per service class per port queue limit $Q_{ij}$ or it may be based on a per connection queue limit, or both. If it is based on both, the controller first determines if the queue exceeds the $Q_{ij}$ for that port and the appropriate service class. If so, the controller determines if the number of stored cells associated with the particular virtual connection exceeds an associated connection threshold. If not, the controller retains the cell. Otherwise, the controller discards the cell and sets the EPD flag (step 114).

If the queue length exceeds the EPD buffer threshold, the controller 18 discards the cell, since the controller cannot ensure that it will have available sufficient buffer space to hold the remaining cells of the packet as they arrive. The controller thus pre-empts what is expected to be a fragmented packet. The controller then sets an EPD flag that is associated with the virtual circuit identified in the cell (steps 111–112).

Thereafter, the controller discards all of the received cells associated with the same packet until it receives the EOP cell (steps 101 and 114–117). The controller thus discards each received cell that contains the same VCI and VPI as the discarded beginning-of-packet cell and a PTI status flag set to 0×0, regardless of whether or not the associated queue length falls below the EPD threshold. Accordingly, if the switch did not yet receive an EOP cell, it treats the next cell as part of the previous packet. The controller checks the state of the associated EPD flag (step 114). If the flag is set the controller discards the cell (step 112). Otherwise, the controller retains the cell in the buffer (step 116). This assumes that, as expected, the output port queue has not reached its queue limit, as discussed below with reference to FIG. 7.

As soon as the controller receives the EOP cell, which has the PTI status flag set to 0×1, it ends its EPD operation and resets the EPD flag (steps 101-107). The controller then checks the CLP bit in the EOP cell to ensure that the bit is set to 0 and, as necessary, it resets the bit (step 103). The EOP cell is thus ensured a high priority, which means that the cell has a greater chance of passing through the remaining switches in the virtual circuit. The controller then retains the cell in its buffer, assuming the output port queue has not reached its limit, as discussed below with reference to FIG. 7.

The controller, using EPD, thus prevents a newly arriving packet from taking up space in the buffer that may instead be used to hold the cells of packets that have already been partially transmitted through the switch. At the same time it maintains packet boundaries so that succeeding cells received over the same virtual circuit can be correctly assigned to the appropriate packets at the destination station.

B. Tail Packet Discard (TPD)

Figure 4:
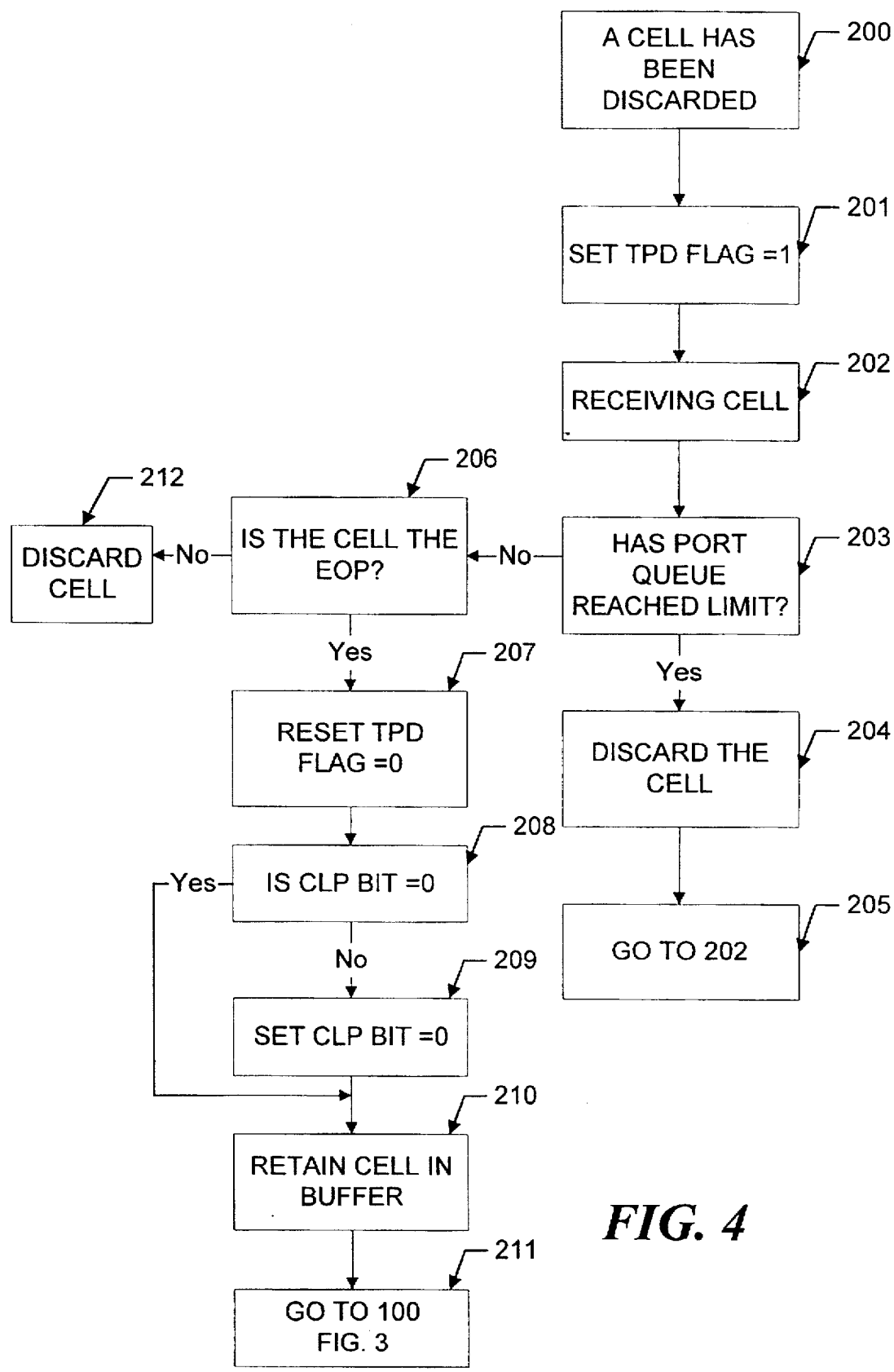
FIG. 4 is a flow chart of the operations of a switch that is performing tail packet discard.

Referring now to FIGS. 1, 2 and 4, each time the controller 18 discards a cell, because of a usage-control-parameter (UPC) or a network-control-parameter (NPC) violation, CLP-selective discarding or a buffer limit or threshold overflow, all as discussed below, it sets a TPD flag that is associated with the virtual circuit identified in the cell (steps 200-201). The controller then discards each of the cells that it receives over that virtual circuit until it receives the EOP cell (steps 202-204). It thus discards all the cells that contain the appropriate VCI and VPI, and a PTI status flag set to 0×0. When the controller receives the EOP cell, it resets the TPD flag and retains the EOP cell in the buffer 14, assuming that the output port queue has not reached its limit. Also, if the CLP bit in the EOP cell is set to 1, the controller resets the bit to 0, to increase the likelihood that the cell will be transmitted through the remaining switches in the virtual circuit (steps 206-210). It is unlikely that the output port queue will have reached its limit, and thus, that the EOP cell must be discarded (step 212), since the controller has discarded the cells that would otherwise form a packet fragment, and thus, preserved available buffer space.

A UPC/NPC violation occurs when a user attempts to use more network bandwidth than is specified in the network guidelines or the user's contract with the network service provider. Depending on the terms of the contract, the service provider may require the switches to (i) charge a premium for the violating cells and transmit them, (ii) "tag" the cells and transmit them, (iii) delay the cells and transmit them, or (iv) discard the cells.

Figure 5A:
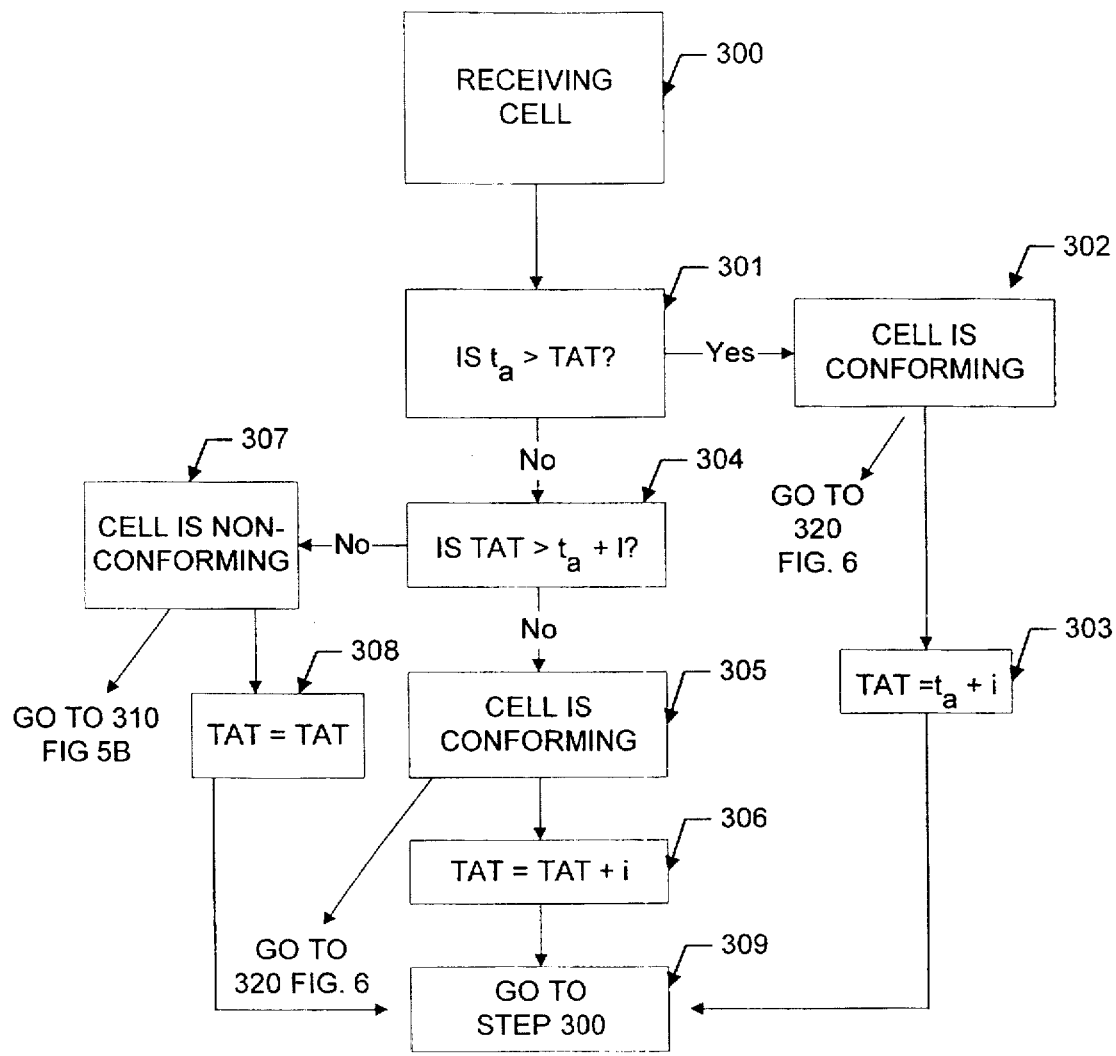
FIGS. 5A–5B together form a flow chart of the operations of a switch that is determining UPC violations.
Figure 5B:
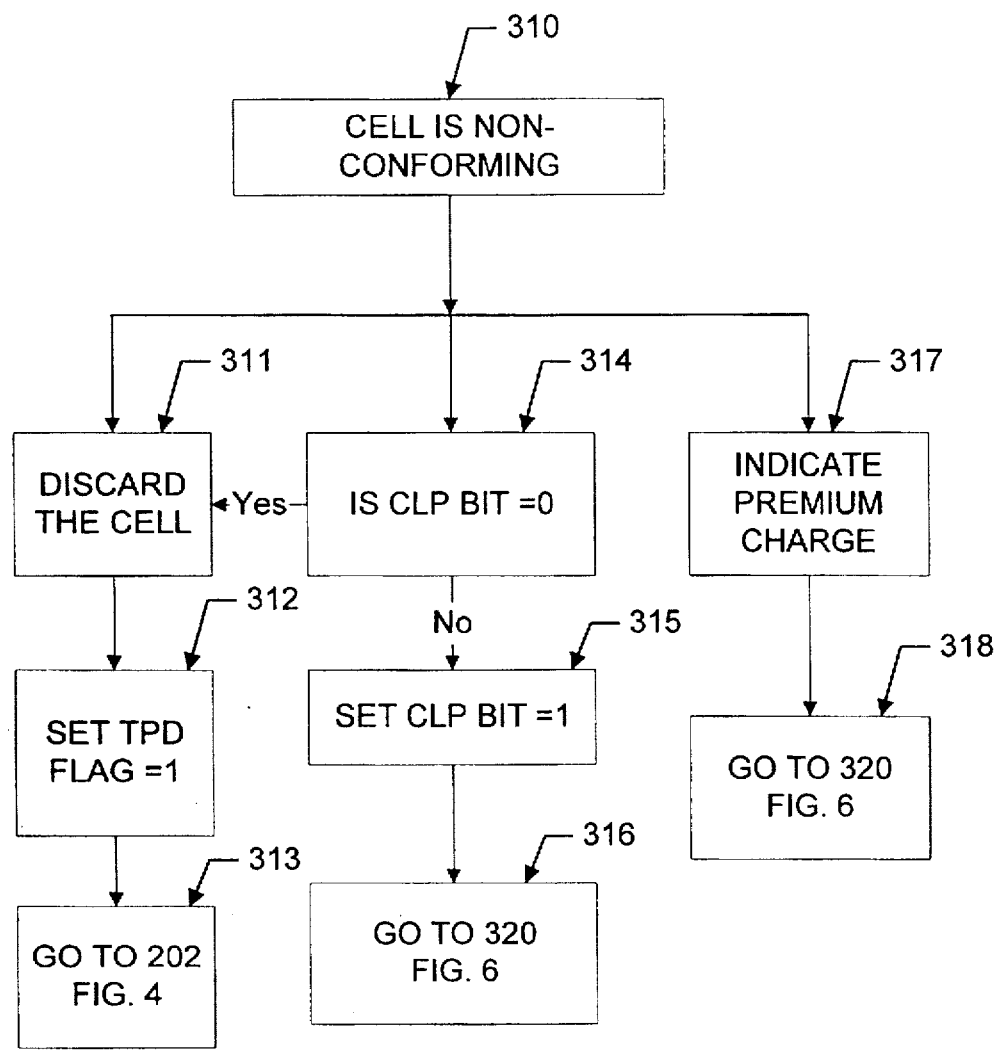

In the preferred embodiment, a UPC/NPC violation is found if a cell arrives ahead of schedule at a switch. Referring now to FIGS. 5A-5B, the switch controller compares the actual time of arrival of a cell to the theoretical time of arrival (TAT), which is the expected time of arrival based on the user's allocated bandwidth. If the actual time of arrival, $t_a$, is greater than the TAT, that is, if the cell arrives after it is expected, the controller determines that the cell is not in violation of the UPCs and the cell is determined to be "conforming." (steps 301-302) The TAT is then set to the actual time of arrival incremented by "i", where i is an increment parameter that is related to the peak or sustainable cell rate that is associated with the allocated bandwidth (step 303).

If the actual time of arrival is less than the TAT, that is, if the cell arrives before it is expected, and thus, before buffer space is theoretically available for the cell, the switch next determines if the time of arrival is within a limit "l" of the TAT, where l defines the cell delay variation tolerance, and thus, an upper limit on cell "clumping." If the time of arrival of the cell is within l of the TAT, the cell is conforming and the switch increments the TAT by i (steps 304-306). Otherwise, the cell is non-conforming and the TAT is not incremented (step 307-308). To determine if a next cell is in violation of the UPCs, the switch compares the time of arrival of the cell with the TAT, incremented or not as appropriate (step 309).

The controller 18 discards, retains or tags the non-conforming cell in accordance with instructions from the network service provider or the user's connection set-up request. If the user's contract or request requires that the cells be retained and a premium charged, the switch treats the cells as if they were conforming cells (steps 317-318). If the user's contract or request provides that nonconforming cells are discarded, the switch discards the cell and invokes TPD (steps 311-313). The switch thus sets the TPD flag associated with the virtual circuit that is identified in the discarded cell, and thereafter discards all the remaining cells of the packet, except the EOP cell, as discussed in more detail below with reference to FIG. 7. This assumes that I-TPD, which is a user-selected option, is actually selected for the connection, which is true by default. However, a user may, in a connection set-up request, specify that the I-TPD not be operative for a particular connection. The following discussion assumes that I-TPD is selected.

If the service provider decides instead to police the user's transmissions, the controller tags high priority cells for future discard and may discard those cells that are already tagged (steps 314-316). If the CLP bit is instead set to 0, the controller sets the bit to 1, that is, it lowers the priority of the cell, and then treats the cell as a conforming cell. If the controller discards a cell, it invokes I-TPD, and the remaining cells of the packet are discarded until the EOP cell is received.

Figure 6:
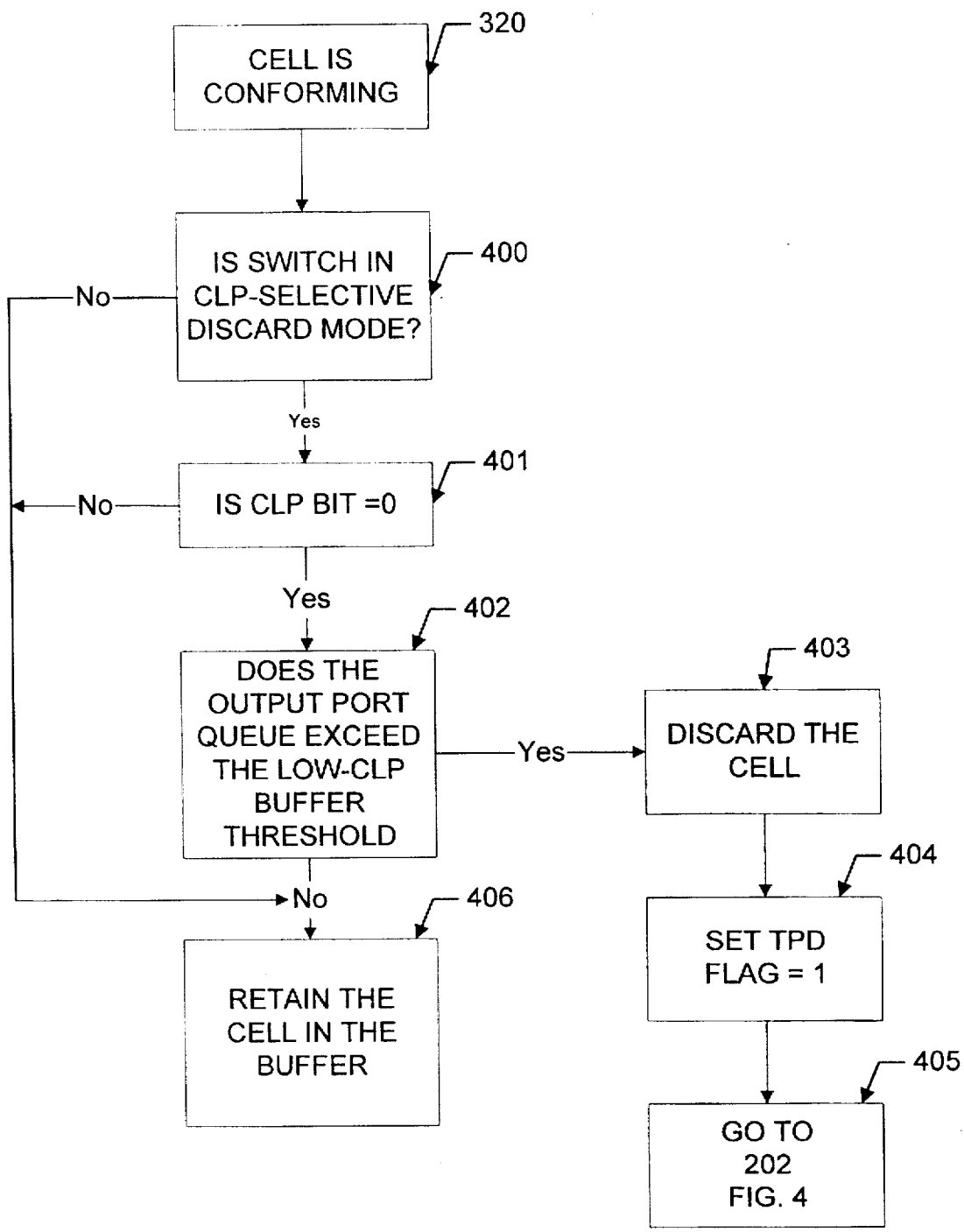
FIG. 6 is a flow chart of the operations of a switch that is performing integrated tail packet discard.

Referring now to FIG. 6, if the switch is operating in CLP-selective discard mode, and the cell has a low priority, the controller compares the associated output port queue length with a low-CLP buffer threshold (steps 400-402). If the threshold is exceeded, the controller discards the low priority cell and sets the associated TPD flag so that all of the remaining cells in the packet, regardless of priority, are discarded until the EOP cell is received (steps 402-405). Otherwise, the cell is retained (step 406). If the cell is instead a high priority cell, the controller retains the cell (steps 401 and 406).

The TPD mechanism discards from the network as many of the cells of a fragmented, or corrupted, packet as possible while still maintaining packet boundaries. Accordingly, it saves buffer space for the cells of non-fragmented packets and also for the EOP cells. In contrast, known prior systems do not consider packet boundaries when performing UPC/NPC or CLP-selective discarding, and thus, produce fragmented packets.

Referring now to FIG. 7, the operations of a switch that performs both EPD and I-TPD are discussed. When the switch receives a cell, the switch controller determines if the cell violates the UPC/NPC. If so, the controller determines how to police the violation (step 501). If the controller discards the cell, the controller also sets the TPD flag (steps 515-516). If the cell is not yet discarded, the controller next determines if the queue length associated with the output port to which the cell is directed has reached the associated queue limits, which include a per service class queue limit, i.e., $L_i$, and/or a per service class per port queue limit $L_{ij}$. Is so, the controller sets the TPD flag and discards the cell (steps 502 and 515–516). If the cell is not discarded and the switch is operating in CLP-selective discarding mode, the controller determines if the cell has a low priority and should be discarded (step 503). If so, the controller sets the TPD flag and discards the cell (steps 515–516).

The controller next determines if the cell is a packet boundary cell (step 504). If the cell is an EOP cell, the controller resets the EPD/TPD flags, sets the CLP bit to 0 and retains the cell in the buffer (steps 509–511 and 507). If the cell is a beginning-of-packet cell, the controller determines if the associated output port queue exceeds the EPD buffer threshold which may, as discussed above, be based on the associated service class queue limit or the associated connection queue limit, or both. If the appropriate threshold is exceeded, the controller sets the EPD flag to 1 and discards the cell (steps 512–514). Otherwise, the controller retains the cell (steps 512 and 507).

The controller repeats these operations for every received cell. Some of the switches may perform some but not all of the operations described above. For example, some switches may not police UPC/NPC violations. These switches then start their operations at step 502. The switches may also use a single packet discard flag that they set whenever EPD or I-TPD is invoked.

In summary, the early/integrated tail packet discard scheme controls cell discarding based on the packet boundaries associated with the cells. This results in the transmission of a maximum number of complete packets and a minimum number of packet fragments. In contrast, known prior systems control most of their cell discarding on a cell-by-cell basis that ignores packet boundaries. These systems thus include in their transmissions a relatively large number of packet fragments, which are generally useless to the destination station and take up network and switch resources that could otherwise be used for complete, or good, packets.

The EPD and I-TPD may be used with AAL ¾ by using packet or message boundary information that is included in the cell payload, rather than in the cell header.

A user may also select an extended EPD/I-TPD, in which successive packets transmitted over the same virtual connection and in the same "transmission window" are discarded once one of the packets in the window is discarded. This extended EPD/I-TPD is generally used with systems that utilize conventional "go-back-N" error recovery, in which the later packets must be retransmitted even if they arrive at the destination station intact.

What is claimed is:

1. A method of operating a switch to discard or retain cells received over a network operating in asynchronous transfer mode, the method including the steps of:
   A. determining if a received cell is an end-of-packet cell, and if so, retaining the cell and associating with the cell a high priority;
   B. determining if the received cell is the beginning of a packet, and if so, determining if a queue of received packets that is associated with an output port to which the cell is directed exceeds an early packet discard threshold,
   C. if the early packet discard threshold is exceeded discarding the received beginning-of-packet cell and setting an early packet discard flag associated with a virtual circuit identified in the cell, and otherwise retaining the cell;
   D. if the cell is not a beginning-of-packet cell or an end-of-packet cell, determining if the early packet discard flag associated with the virtual circuit identified in the cell is set, and if the flag is set discarding the cell or if the flag is not set retaining the cell; and
   F. repeating steps A–D for each cell.

2. The method of claim 1 further including:
   a first step of
      L. determining if the cell is in violation of a usage or network parameter control, and if so, discarding the cell and setting the associated tail packet discard flag; and
   in the step of discarding or retaining the cell that is not a beginning-of-packet cell or an end-of-packet cell, further including
      M. determining if the tail packet discard flag associated with the virtual circuit identified in the cell is set and if so discarding each received cell that is not an end of packet cell.

3. The method of claim 2 further including, before the step of determining if the cell is an end-of-packet cell, the steps of:
   N. determining if the received cell has a low cell loss priority, and if so, comparing the length of the queue of received cells associated with the output port to a predetermined low-priority buffer threshold;
   Q. discarding the received cell if the threshold is exceeded, and setting the associated tail packet discard flag.

4. The method of claim 1 wherein the early packet discard threshold is a percentage of an associated service class per port queue limit.

5. The method of claim 1 wherein the early packet discard threshold is a percentage of an associated per connection queue limit.

6. The method of claim 4 wherein if the threshold based on the service class queue limit is exceeded, an associated threshold based on a per connection queue limit is checked.

7. A method of operating a switch to discard or retain cells received over a network operating in asynchronous transfer mode, the method including the steps of:
   A. determining if a received cell violates usage or network parameter controls, and if so discarding the cell and setting a tail packet discard flag;
   B. if the tail packet discard flag is not set, determining if a queue of retained cells, that is associated with an output port that is part of the virtual circuit identified in the cell, exceeds an associated queue limit, and if the limit is exceeded, discarding the cell and setting the associated tail packet discard flag;
   C. determining, if the switch is operating in a CLP-selective discard mode and the cell has a low priority, and if so, comparing the length of the output port queue with a predetermined low-CLP threshold and discarding the cell and setting the associated tail packet discard flag if the threshold is exceeded;
   D. determining if the cell is an end-of-packet cell, and if so associating with the cell a high priority, retaining the cell and re-setting, as necessary, the associated tail packet discard flag;
   E. if the cell is not an end-of-packet cell, determining if the associated tail packet discard flag is set, and if so discarding the cell; and
   F. retaining the cell if the cell is not discard in steps A–E.

8. The method of claim 7, further including the steps of:
   G. determining if the cell is a beginning-of-packet cell, and if so, determining if the queue associated with the output port exceeds an early packet discard buffer threshold;

H. if the early packet discard threshold is exceeded, discarding the cell and setting an associated early packet discard flag;

I. if the early packet discard flag is set, discarding each of the cells associated with the same virtual circuit until the end-of-packet cell is received;

J. when the end-of-packet cell is received, resetting the associated early packet discard flag, associating a high priority with the cell and retaining the cell.

9. The method of claim 8, wherein the tail packet discard flag and the early packet discard flag are the same flag.

10. The method of claim 7 wherein the step of determining if the associated output port queue is exceeded further includes determining if an associated threshold based on a service class queue limit is exceeded.

11. The method of claim 10 further including determining if a second threshold based on a service class per port queue limit is exceeded.

12. A switch for discarding or retaining for further transmission cells received over a network operating in asynchronous transfer mode, the cells being associated with a packet that includes a plurality of cells, the switch including:

A. plurality of input ports for receiving cells over the network;

B. a plurality of output ports for transmitting cells over the network;

C. a buffer with a plurality of locations for retaining in each of the locations a cell for transmission by one or more of the output ports;

D. a controller for controlling the ports and the buffer, the controller including i. means for associating with each output port one or more queue limits that set maximum numbers of buffer locations that may be allocated to retained cells that are awaiting transmission by the port;

ii. means for determining, when a cell is received, if the cell violates associated usage or network control parameters, and if so, discarding the cell;

iii. means for determining if the queue of retained cells associated with the output port to which the cell is directed has reached the applicable queue limit, and if so, discarding the cell;

iv. tail packet discard means for, when a cell is discarded, invoking tail packet discarding, said means discarding all the received cells that are associated with the same packet as the cell that caused the invocation of the tail packet discarding, except an associated end-of-packet cell;

v. end-of-packet means for determining if the received cell is an end-of-packet cell, said means associating a high priority with the end-of-packet cell and retaining the cell, said means directing the tail packet discard means to revoke the tail packet discarding when the end-of-packet cell is retained; and vi. means for retaining in the buffer the cells that have not been discarded.

13. The switch of claim 12, wherein the controller further includes vii. CLP-selective discarding means for determining if a received cell has associated with it a low priority, and if so, determining if the associated queue has reached a low-CLP threshold, discarding the cell if the queue has reached the threshold, and if the cell has a high priority, setting the priority of the cell to low and retaining the cell, said means directing the tail packet discard means to invoke tail packet discarding if the cell is discarded.

14. The switch of claim 13, wherein the controller further includes viii. an early packet discard means, said means determining if a cell is a beginning-of-packet cell, and if so, determining if the queue associated with the output port queue to which the cell is directed exceeds an early packet discard threshold, said means discarding the cell and invoking early packet discarding if the appropriate threshold is exceeded, wherein said means discards all received cells that are associated with the same packet as the cell that caused the invocation of the early packet discarding, except an end-of-packet cell, said means revoking the early packet discarding if the end-of-packet cell is retained.

15. The switch of claim 14, wherein the buffer is shared among the output ports, and the buffer locations are dynamically allocated to the output ports.

16. The switch of claim 15, wherein the early packet discard threshold associated with a particular output port is based on the expected traffic at the port.

17. The switch of claim 16, wherein the queue limits associated with the output ports vary by delay service class.

18. The switch of claim 17, wherein the controller determines if the received cell is the end-of-packet cell by determining the state of a status flag in the cell header.

19. The switch of claim 14, wherein the CLP and early packet discard thresholds are percentages of the queue limits.

20. The switch of claim 19, wherein the early packet discard threshold is a percentage of a service class per port queue limit.

21. The switch of claim 19, wherein the early packet discard threshold is a percentage of an associated per connection queue limit.

22. The switch of claim 20, wherein the early packet threshold further includes a second threshold based on a per connection queue limit, the early packet discard means determining if the second threshold is exceeded after it determines that the first threshold is exceeded.

23. The switch of claim 12 wherein the tail packet discard means discards successive packets in a transmission window once tail packet discarding is invoked for one of the packets in the window.

24. The switch of claim 14 wherein the early packet discard means discards successive packets in a transmission window once early packet discarding is invoked for one of the packets in the window.

* * * * *